United States Patent
Huang et al.

(10) Patent No.: US 9,965,566 B2
(45) Date of Patent: May 8, 2018

(54) TARGET CRITERION-BASED DATA FILE DISTRIBUTION

(71) Applicant: Microsoft Technology Licensing, LLC, Redmond, WA (US)

(72) Inventors: Jiansheng Huang, Mountain View, CA (US); Sanjay Sureshchandra Dubey, Fremont, CA (US); Anmol Bhasin, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 13/665,742

(22) Filed: Oct. 31, 2012

(65) Prior Publication Data
US 2014/0122571 A1    May 1, 2014

(51) Int. Cl.
*G06F 15/16* (2006.01)
*G06F 17/30* (2006.01)

(52) U.S. Cl.
CPC .... *G06F 17/3089* (2013.01); *G06F 17/30861* (2013.01)

(58) Field of Classification Search
CPC .............. G06Q 30/02; G06Q 30/0269; G06Q 30/0201; G06Q 30/0241; G06Q 30/0277; G06Q 30/0271; G06Q 50/01; H04N 21/812; H04N 21/6125; G06F 17/30861; G06F 17/3089

USPC ............... 709/203, 204, 218, 224; 705/14.66
See application file for complete search history.

(56) References Cited

U.S. PATENT DOCUMENTS

| | | | |
|---|---|---|---|
| 6,381,601 B1* | 4/2002 | Fujiwara et al. ............. | 707/692 |
| 6,647,383 B1* | 11/2003 | August ............. | G06F 17/30867 |
| 7,779,103 B1* | 8/2010 | Fikes .................. | G06F 21/6263 709/219 |
| 2008/0201733 A1* | 8/2008 | Ertugrul ............ | G06F 17/30867 725/32 |
| 2010/0228614 A1* | 9/2010 | Zhang et al. ............... | 705/14.16 |
| 2010/0274672 A1* | 10/2010 | Patel .......................... | 705/14.66 |
| 2010/0324994 A1* | 12/2010 | Crawford ................... | 705/14.58 |
| 2011/0282739 A1* | 11/2011 | Mashinsky et al. ........ | 705/14.53 |
| 2013/0085858 A1* | 4/2013 | Sim ........................ | G06Q 30/02 705/14.58 |
| 2013/0198299 A1* | 8/2013 | Chhaochharia ......... | H04L 51/04 709/206 |

* cited by examiner

*Primary Examiner* — Oleg Survillo
*Assistant Examiner* — Tan Doan
(74) *Attorney, Agent, or Firm* — Schwegman Lundberg & Woessner, P.A.

(57) ABSTRACT

A system may include a network interface and a batch processor coupled to the network interface. The batch processor may be configured to obtain social network profiles corresponding to entities and to obtain a target criterion. The batch processor may be configured to identify at least some of the entities based on a relationship between the social network profiles and the target criterion and to transmit, via the network interface, a data file to a computing device of the at least some of the entities, wherein the data file contains information related, at least in part, to the target criterion.

24 Claims, 6 Drawing Sheets

TARGET CRITERION-BASED DATA FILE DISTRIBUTION

TECHNICAL FIELD

The subject matter disclosed herein generally relates to the distribution of data files to multiple entities based on a relationship between a target criterion and profiles of the entities.

BACKGROUND

Electronic data files can be distributed to web browsers for a variety of reasons. A common data file that can be transmitted from a website provider to a web browser that utilizes the website is known in the art as a "cookie". Cookies can maintain a record of a profile of the web browser, such as can include past activities and characteristics of the web browser, and transmit that information to the website, such as upon the web browser returning to the website. The website can then utilize the information included in or collected by the cookie to transmit content to the web browser that is pertinent to the profile of the web browser provided by the cookie.

BRIEF DESCRIPTION OF THE DRAWINGS

Some embodiments are illustrated by way of example and not limitation in the figures of the accompanying drawings.

DETAILED DESCRIPTION

Example methods and systems are directed to target criterion-based data file distribution. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The provision of data files, such as cookies, to web browsers can be relatively inefficient for the provider of data files. Owing to the cost of incorporating computing resources in online systems, it can be relatively expensive and inefficient to incorporate processing resources into, for instance, the servers that actually manage the distribution of data files to web browsers. Consequently, while a web server might efficiently note that a web browser profile has changed, and that the profile change could support sending the web browser a new or updated data file, it may not be efficient for a web server to sort through potentially millions of web browser profiles or more to identify some or all of the profiles that can be provided with a new or updated data file.

A system has been developed that can conduct large-scale computing operations relating to identifying and provisioning web browser profiles to which a particular data file can be associated and sent. The system can be an offline system, in that the system can be physically or logically separated from resources related to normal web server functions. The offline system can be utilized for development activities that can be kept separate from the online environment. While the offline system can manage large-scale provisioning of a single data file to multiple web browsers, the online system can manage interactions with individual web browsers, such as by sending a new or updated file to a web browser that has had a change in its profile.

The use of large-scale computing resources, such as batch processing, can provide for the ability to conduct widespread, specific targeting of data files based on web browser profiles. Batch processing, such as in the offline system, can incorporate relatively more targeting criteria applied to relatively more web browser profiles than may be achieved through conventional processing, such as in the online system. Consequently, the ability to transmit cookies to web browsers that can then provision advertisements that are increasingly specific to the particular profile of the web browser may be enhanced over relatively more one-size-fits-all advertisement provisioning. The use of the offline system can allow for more rapid provision of advertisements, in some cases allowing for what would be identified in the art as real-time or substantially real-time provisioning of advertisements that may permit advertisers to engage in real-time bidding to provision ads to particular, targeted users.

Figure 1:
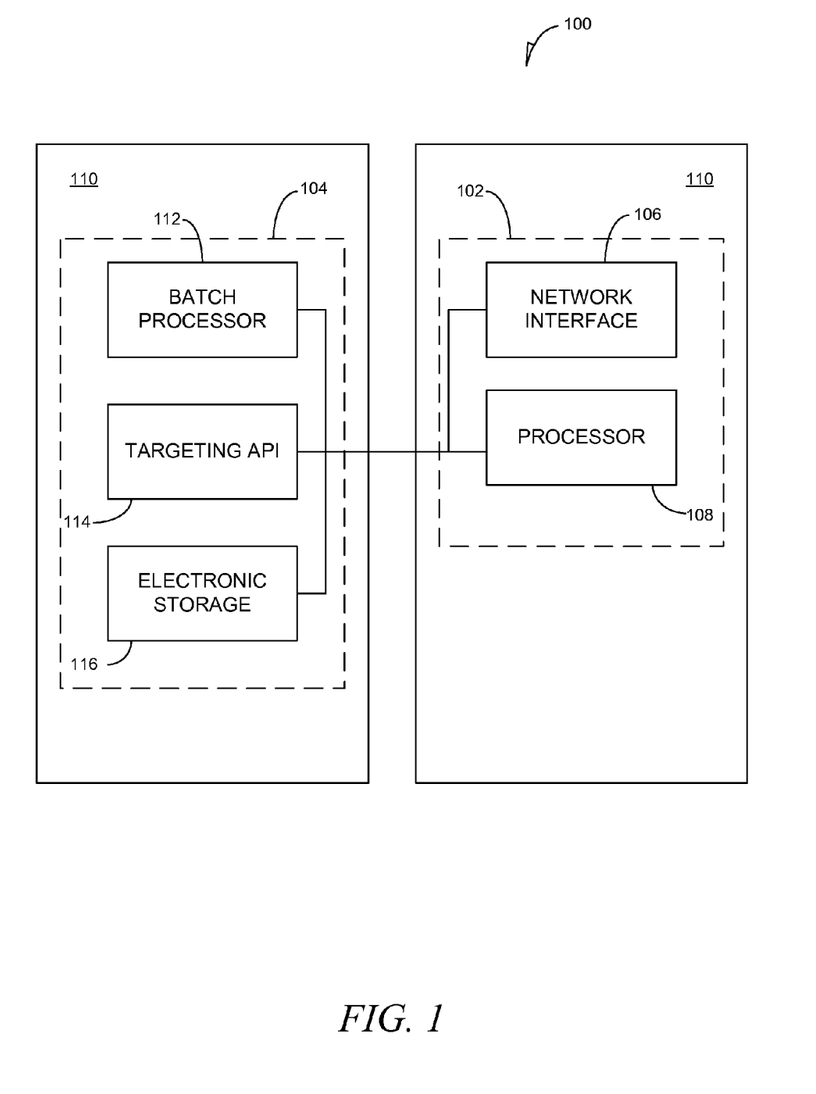
FIG. 1 is a block diagram of a social networking system having an online system and an offline system.

FIG. 1 is a block diagram of a social networking system 100 having an online system 102 and an offline system 104. The online system 102 can generally be directed towards collecting information from one or more users, web browsers, and the users' and web browsers' related profiles, as well as transmitting data files, such as cookies, to the users and web browsers. The online system can also be directed toward provisioning data files, such as cookies, to individual users or web browsers based on relatively simple criteria. The offline system 104 can be generally directed towards processing information obtained from the online system 102 and identifying and providing a data file, such as a cookie, to multiple users or multiple web browsers. The offline 104 does not necessarily incorporate electronics configured to serve information directly to an outside network, such as the Internet. Alternatively, the offline system 104 can be a component of the online system 102 or other system that is configured to interface directly with an outside network.

The online system 102 can include a network interface 106 that can communicate with an outside network, such as the Internet. The network interface 106 can communicate according to conventional networking protocols well known in the art or according to proprietary protocols. The online system 102 can further include a processor 108. The processor 108 can be a microprocessor or other processing system known in the art. The online system 102 can utilize the processor 108 or other conventional resources of a server 110, such as electronic storage, electronic memory, and the like, to provide management functions for provisioning data files to destinations outside of the system 100. In an example, the resources of the server 110 can implement an application programming interface (API) for provisioning data files.

The offline system 104 can be implemented on one or more servers 110. The offline system 104 can include a batch processor 112 and a data file targeting API 114. The targeting API 114 can, in various examples, run on, utilize, or incorporate the batch processor 112 to target individual data files to specific users or web browsers based on profile characteristics of some or all of the users or web browsers for which profile characteristics are possessed. In an example, an electronic storage module 116 is included in the offline system 104 that is configured to store the profiles. The electronic storage module 116 can include a hard disk, electronic memory, or other forms of electronic storage and/or memory known in the art. The servers 110 can be communicatively coupled to the Internet and to one another. The offline system 104 can be coupled to the online system 102, such as via a dedicated network or via the Internet.

The batch processor 112 can process a set or batch of input data files and produce a set of output data files based on some or all of the input files considered together. Batch processing can stand in contrast to the serial processing of individual files. In an example, the online system 102 utilizes serial processing in contrast to the batch processing of the offline system 104.

Operations of the offline system 104 are not necessarily pushed to the online system 102 for transmittal of a data file to a user or web browser. In an example, the offline system 104 can be utilized offline for development, such as for data file and criteria for transmitting a particular data file to particular users or web browsers. Such development can include developing and testing new systems and processes that may ultimately be utilized by the system 100 generally. The offline system 104 discussed herein can be utilized, such as by system administrators or developers, in substantial or complete communication isolation from the online system 102.

In an alternative example, the offline system 104 can be implemented on the same servers 110 that implement the online system 102. In such an example, the offline system 104 can utilize relatively powerful computing resources of the servers 110, such as the batch processor 112, that are not utilized by the online system 102. The online system 102 can utilize relatively less-powerful or unsophisticated computing resources, such as the processor 108. In various examples, the online system 102 can utilize relatively power computing resources, such as the batch processor 112, occasionally but infrequently.

The batch processor 112 can process multiple data file transmission criteria concurrently or effectively concurrently. Each process for generating data file transmission can be referred to as a "job", with the batch processor 112 configured to manage multiple jobs concurrently, known as multi-tenancy. Concurrent processing of jobs can include processing some or all of the jobs at the same time. Additional jobs can be added while other jobs are being processed, making the batch processing of jobs scalable.

Each job can be a collection of one or more scripts configured to execute one or more tasks related to associating individual profiles with a particular data file, or other task to which a particular job is directed. In an example, the offline system 104 utilizes Apache Hadoop as licensed under the Apache version 2.0 license (Apache and Hadoop are trademarks of the Apache Software Foundation). In an example, the batch processor 112 utilizes the Hadoop Pig scripting language. In various examples, alternative distributed computing and file sharing standards, as well as different scripting languages within Hadoop, can be utilized.

Targeting of data files can occur on the basis of one or more criteria, such as can be compared by the batch processor 112 against the profiles stored in the electronic storage 116. Targeting of data files can be on the basis of and/or controlled by the targeting API 114. Criteria for targeting a data file to various individual ones of the users or web browsers that correspond to the profiles can be based in a member profile; data relating to an entity, such as a company, that is providing the data file or, in the case of a cookie, that provides the content that is directed to the cookie once the cookie is installed; career information of a user; and other information, such as custom user data, network size, geographic location, user subscription status, company job postings, and a user employment status.

Criteria relating to a member profile can include a member identifier (encoded or otherwise), a company identifier based on the member's current employment, a geographic location of the member, related groups, educational characteristics, age, and other criteria related to the member. The data relating to an entity can include company size, geographic location, products, available job postings, and other company information. User career information can include job title, seniority, job function, gender, and other factors.

In various examples, the system includes an advertising server. In various examples, the advertising server is or is a component of the server 110. In various examples, the advertising server is a component of the offline system 104 separate from the server 110. In various examples, the advertising server is a component of the online system 102, or combines functionality of both the online system 102 and the offline system 104.

The advertising server is configured to store and transmit advertisements to computing systems of the members of the social network. The advertising server can transmit the advertisements to computing systems based on the computing systems having been provisioned with a data file by the system 100, such as when the data file is an electronic cookie. When a user of the social network utilizes a computing system that includes a particular electronic cookie to access the social network, the advertising server cannot the presence of the electronic cookie on the computing system and transmit an advertisement to the computing system for display to the user, such as while the user is using the social network. The server 110 can be loaded with data files, such as electronic cookies, that correspond to advertisements that are loaded in the advertising server. Thus, as a particular advertisement is added to the advertising server, the advertisement can be associated with a data file, such as an electronic cookie, that has been, is being, or will be added to the server for transmittal to computing systems of users of the social network based on the profiles of the corresponding users.

Figure 2:
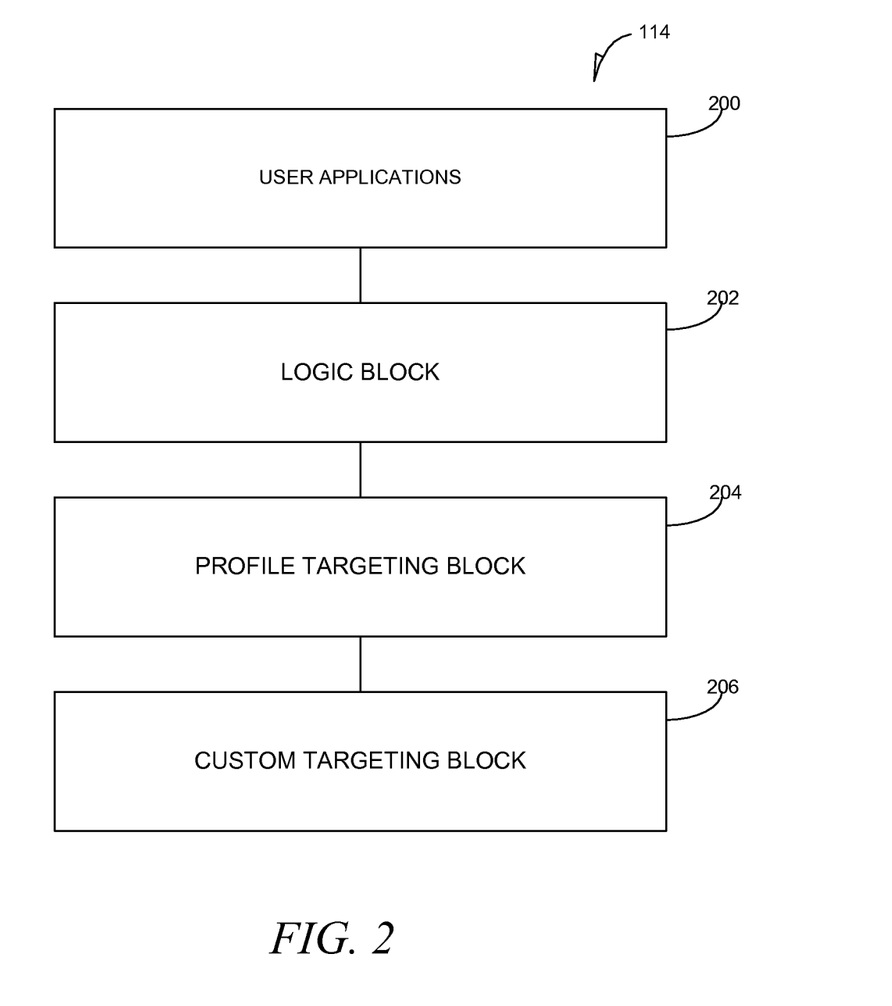
FIG. 2 is a block diagram of a targeting API.

FIG. 2 is a block diagram of the targeting API 114. The various functions of the targeting API 114 can be incorporated with respect to the offline system 104 generally in various examples, and not necessarily specifically with respect to the targeting API 114 specifically. The targeting API 114 can utilize systems of the offline system 104, including the batch processor 112 and the electronic storage 116.

User applications 200 can incorporate functionality to obtain profiles. The user application 200 can be directly resident within the targeting API 114, can be resident on a client system, such as a web browser, or can be shared between the targeting API and the client system. The user applications 200 can obtain profiles due to direct user input or through user conduct and activities.

A logic block 202 can direct user profiles received from the user applications 200 according to the characteristics of the profiles. The logic block 202 can direct profile information to a profile targeting block 204 for immediate use in directing data files, to a cache for near-term use, and/or to the electronic storage 116 for long-term storage. The logic block 202 can direct that an existing file be replaced or overwritten in the even that the newly obtained profile information updates existing profile information.

The profile targeting block 204 can be or otherwise incorporate a data system for management of profiles and comparison of profiles against targeting criteria to produce a list of targets for data files. The profile targeting block 204 can utilize the batch processor 112 to compare the profiles against the targeting criteria. Each job run by the batch processor 112 can be one such comparison. In an example, the profile targeting block 204 can provide multiple such comparisons to the batch processor 112 to run as separate jobs.

The profile targeting block 204 can obtain specifically selected and detailed criteria from a custom segment block 206. Each custom segment can specify one or more particular criteria against which the profiles are to be compared by the profile targeting block 204. The details of each segment can be specified by a user. The profile targeting block 204 can output a list of profiles that meet the targeting criteria of each segment.

Figure 3:
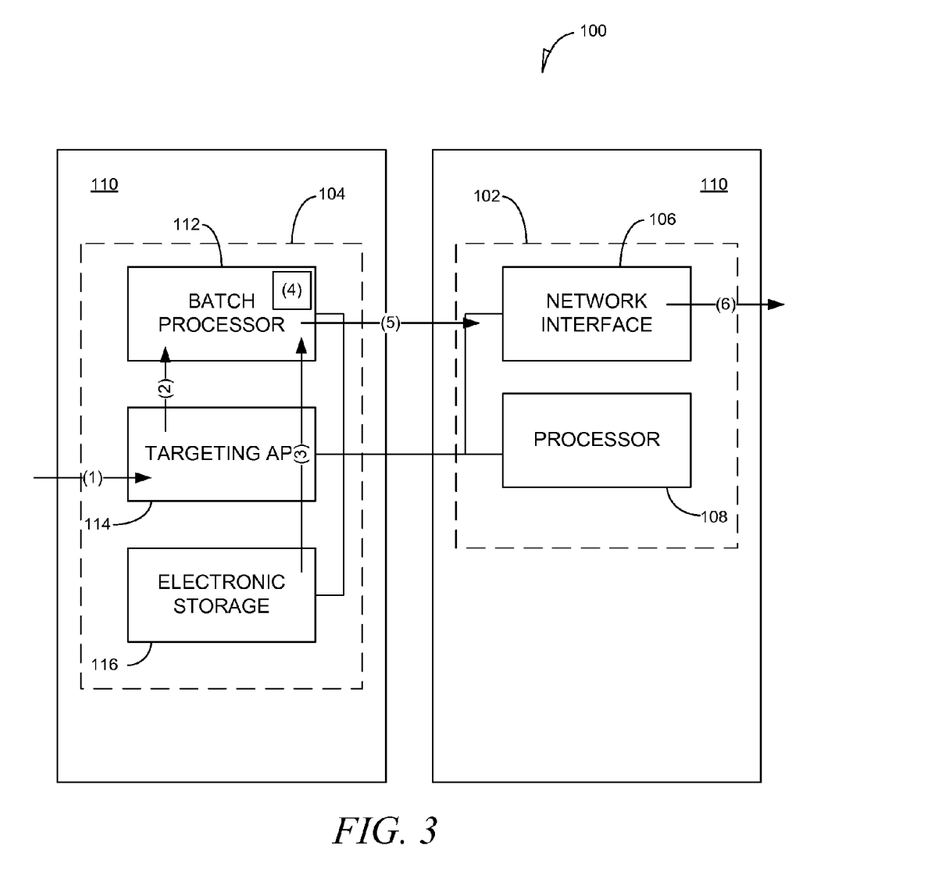
FIG. 3 is a flow diagram illustrating the transmittal of a data file based on the reception of a target criterion.

FIG. 3 is a flow diagram illustrating the transmittal of a data file based on the reception of a target criterion. The transmittal of the data file can be in contrast to circumstances in which a data file is transmitted to an entity following identification of a change in a user profile, as will be discussed below with respect to FIG. 4. In various examples, the flow diagram of FIG. 3 illustrates the transmittal of a data file to multiple entities based in part on the reception of a new or updated target criterion.

In flow step (1), a target criterion is input to the offline system 104 generally and to the targeting API 114 specifically. In an example, the target criterion is stored in the electronic storage 116. In various examples, the target criterion is inputted based on the requirements of a third party, such as an advertising customer of the social network. In various examples, the target criterion is provided by developers or managers of the social network for the direction of social network content to particular users.

In flow step (2), the target criterion is transferred to the batch processor 112. Optionally, in examples in which the target criterion was not stored in the electronic storage 116 but rather is transferred directly to the batch processor 112, flow step (2) is not performed.

In flow step (3), user profiles of users of the social network are transferred from the electronic storage 116 to the batch processor 112.

In flow step (4), the targeting API 114 applies the target criterion against the user profiles using the batch processor 112. In an example, the target criteria is one or more target criteria and, when compared against user profiles, identifies users who may qualify to receive a data file.

In flow step (5), the batch processor 112 transmits an identity of the users who should receive the data file to the online system 102.

In flow step (6), the processor 108 initiates transmission of the data file to the identified users via the network interface 106. In various examples, the data file is an advertisement.

Figure 4:
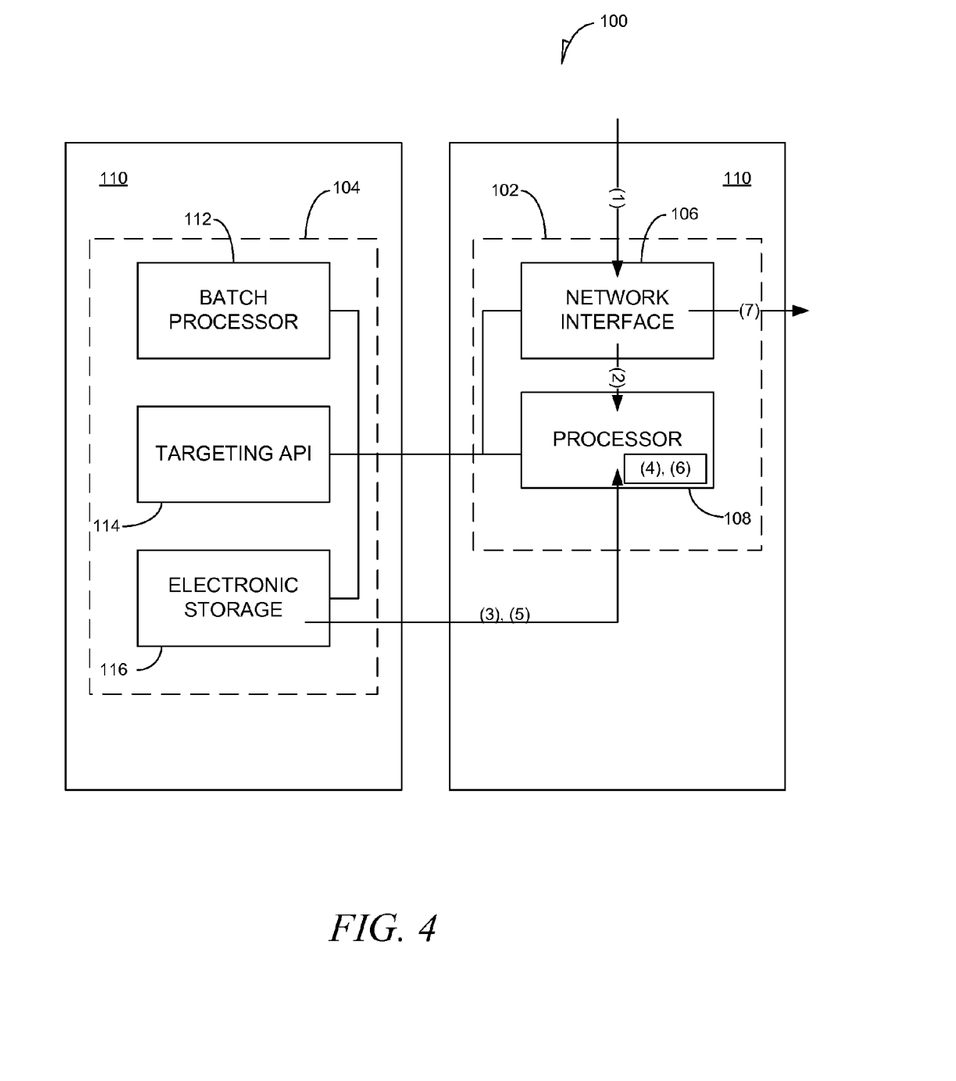
FIG. 4 is a flow diagram illustrating the transmittal of a data file based on a change in a user profile.

FIG. 4 is a flow diagram illustrating the transmittal of a data file based on a change in a user profile. The flow diagram of FIG. 3 can be understood, in contrast to that of FIG. 4, to be based on the reception of new a new target criterion. In such an example, a user, such as an advertiser, supplies a new target criterion for an advertisement to the social network, which inputs the target criterion into the offline system and then outputs the advertisement data file to the appropriate users based on the comparison of the target criterion to the user profile.

FIG. 4, in contrast to FIG. 3, can be based on a change in a particular user profile rather than the uploading of new targeting criteria. Where a user profile changes, whether by the addition of a new user or updating an existing user profile, the changed profile can be compared against existing target criteria to identify a data file that should be sent to the user based on the change. In this way, the flow diagram of FIG. 3 can be directed toward a change in target criteria that potentially impacts all of the users of the social network while the flow diagram of FIG. 4 can be directed toward managing changes to individual user profiles.

Referring to FIG. 4, in flow step (1), a user profile is received via the network interface 106.

In flow step (2), the user profile received via the network interface 106 is transferred to the processor 108.

In flow step (3), the processor 108 obtains a stored user profile that corresponds to the received user profile in flow step (1). In various examples, the stored user profile has been stored in the electronic storage 116.

In flow step (4), the processor 108 compares the received user profile against the stored user profile to identify a change in the user profile.

In flow step (5), if a change in the user profile has been identified, a target criterion is transferred to the processor 108. The target criterion can be provisioned directly from the offline system 104 or can have been stored in the online system 102.

In flow step (6), the processor 108 compares the changed user profile against the target criterion.

In flow step (7), if the changed user profile meets the target criterion, the online system 102 transmits a corresponding data file to the user corresponding to the user profile via the network interface 106.

Figure 5:
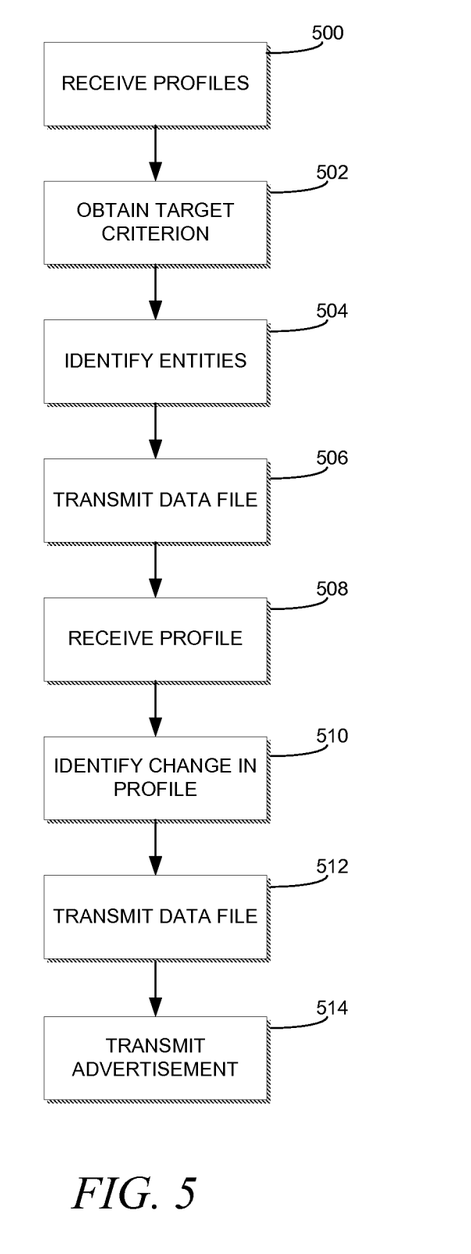
FIG. 5 is a flowchart for transmitting a data file to a computing device of an entity.

FIG. 5 is a flowchart for transmitting a data file to a computing device of an entity. The flowchart can utilize the social networking system 100 or any other suitable system or device.

In operation 500, the offline system 104 generally and, in an example, the batch processor 112 specifically, receives profiles corresponding to entities, such as a user of a social network, a company, an organization, or any other entity that may be a member of, interface with, or be interfaced by the social network. Each entity in question can have a corresponding profile.

The profiles can be stored in the electronic storage 116, such as in a database provided in the electronic storage 116. The database can include multiple profiles, such as profiles for some or all of the entities of the social network. The database can further include data files that can be transmitted to computing devices of the entities of the social network and targeting criteria for the various data files that can define the characteristics of the entities for which the data files are intended and to which the data files should be transmitted.

The data files can be an electronic cookie, as disclosed herein. The electronic cookie can be configured to identify a characteristic of entities with which the electronic cookie has been associated.

In operation 502, the batch processor 112 can obtain a target criterion. The target criterion can be loaded into the batch offline system 104, such as by an entity that desires to distribute a data file to entities related to the social network based on the target criterion. The target criterion can include one or more criteria.

In operation 504, the batch processor 112 can identify at least some of the entities of the social network based on a relationship between the targeting criterion and the profiles. The batch processor 112 can assess the profiles against the targeting criterion to identify profiles that meet the targeting criterion. In various examples, the batch processor 112 can identify a predetermined number of profiles that best fit the targeting criterion. In an example where the targeting criterion is to identify one thousand (1,000) entities with an age as young as possible but not more than twenty-one (21), if the population of entities includes at least one thousand (1,000) entities with an age less than twenty-one (21), then the youngest one thousand (1,000) entities will be identified. If the population includes fewer than entities with an age less than twenty-one (21) than one thousand (1,000), then only those entities with an age less than twenty-one (21) may be identified, thereby identifying fewer than one thousand (1,000) entities.

In operation 506, a data file, such as data files disclosed herein, can be transmitted by the network interface 106 to a computing device at least some of the entities, such as those entities identified by the batch processor 112 in operation 504. The data file can include information related, at last in part, to the target criterion. In an example, where the target criterion is for a entity with an age less than twenty-one (21) years, the data file may include an advertisement directed and intended for a minor.

In operation 508, a profile corresponding to an entity of the social network can be received by the processor 108 via the network interface 106. The profile can be a new profile or an update to an existing profile, such as a profile stored in the electronic storage 116.

In operation 510, the processor 108 can identify a change in the profile received by the network interface 106 in operation 508 relative to the profile stored in the electronic storage 116. Where the profile received by the network interface 106 is a new profile, the change can be registered by identifying the profile as new to the system 100. Where the profile received by the network interface 106 is a change to a profile previously stored in the electronic storage 116, the processor 108 can identify aspects of the profile that have changed. For instance, where an entity profile that is received via the network interface 106 reflects a different career than a profile of the entity stored in the electronic storage 116, the processor 108 can identify that the entity has changed career.

In operation 512, the data file can be transmitted, such as to a computing device of the entity, by the processor 108 via the network interface 106. In various examples, the transmittal of the data file can be based on the identification of the change in the profile and the targeting criterion. The transmittal of the data file can be caused by the identification of the change in the profile. In other words, the reception of the changed profile can serve as a trigger for the system 100 transmitting a data file that is suitable to the entity corresponding to the profile, such as may be more appropriate to the entity than a previously transmitted data file. In that way, changing circumstances for an entity of the social network can result in a more suitable data file being transmitted to the entity, and transmittal of the data file can occur upon receiving the changed profile by the system 100.

In operation 514, an advertisement is transmitted to a computing device of at least one of the entities based on the entity stored the data file, such as an electronic cookie, that corresponds to a target characteristic of the advertisement. In an example, where an advertisement has a target characteristic of a female aged forty (40) to fifty-five (55), the advertising server can note that a computing device of a user of the social network has access the social network, and that the computing device includes a data file, such as an electronic cookie, that corresponds to a user who is female aged forty (40) to fifty-five (55). The advertising server can then transmit the advertisement to a computing device of the user, such as an electronic device include a personal computer, notebook, netbook, table computer, smartphone and other electronic devices known in the art. Such electronic devices can include a web browser on which the social network and the advertisement can be displayed.

Figure 6:
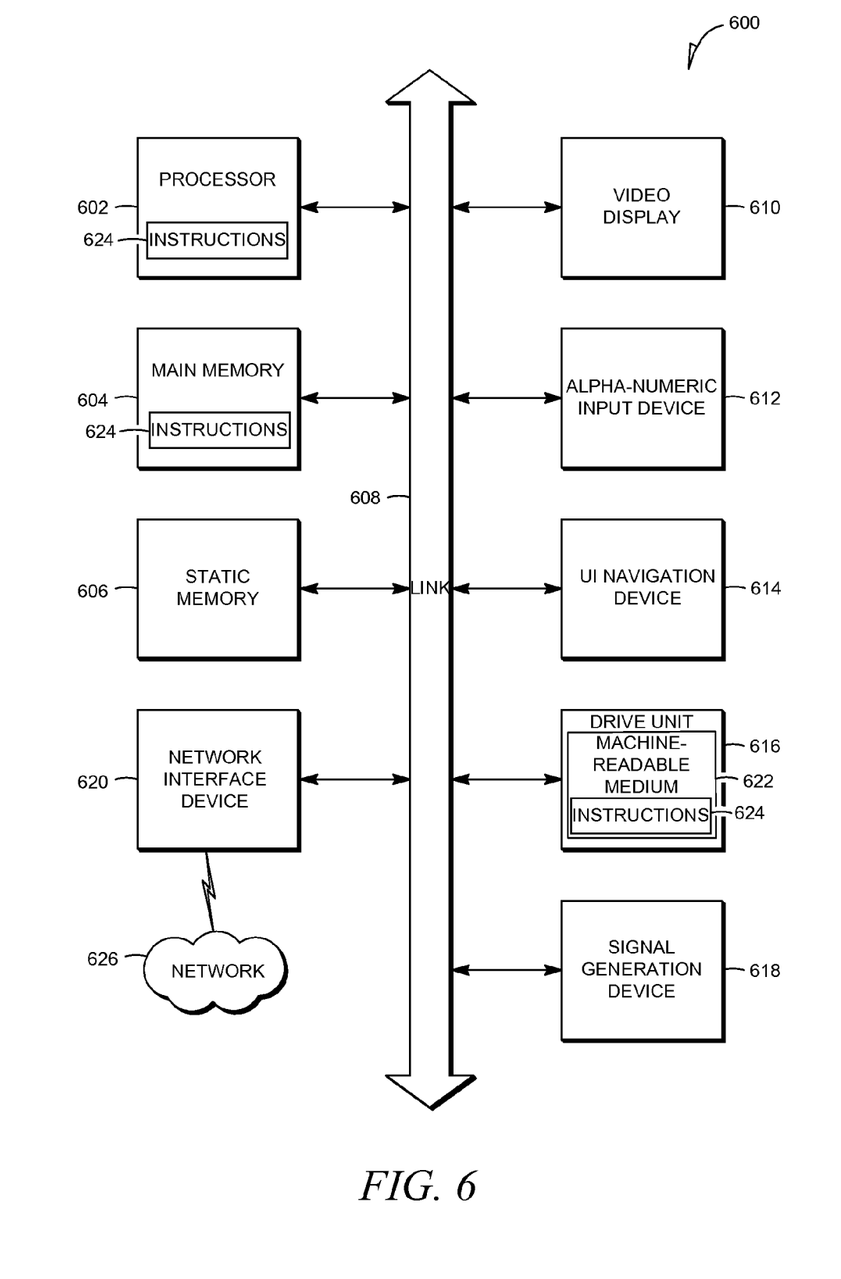
FIG. 6 is a block diagram illustrating components of a machine able to read instructions from a machine-readable medium.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
   obtaining, with a targeting application programming interface (API), a target criterion;
   transmitting the target criterion from the targeting API to a batch processor of an offline system;
   obtaining, with the batch processor, profiles corresponding to entities;
   obtaining, with the batch processor a target criterion;
   receiving, with the batch processor, via a network interface, a profile corresponding to one of the entities;
   processing, with the batch processor, the profiles simultaneously to identify at least some of the entities based on a relationship between the profiles and the target criterion; and
   transmitting, via the network interface, a first data file to a computing device of the at least some of the entities, wherein the first data file contains information related, at least in part, to the target criterion; and
   receiving, with a processor of an online system, the processor being different than the batch processor, a profile corresponding to one of the entities;
   identifying, with the processor, a change in the profile as received relative to the profiles stored in an electronic storage by:
   obtaining one of the profiles stored in the electronic storage corresponding to the one of the entities;
   comparing the one of the profiles with the profile as received to generate a comparison;
   obtaining the target criterion from the offline system; and
   determining, based on the comparison, that the profile as received corresponds to the target criterion; and
   transmitting, with the processor, based on the determination that the profile as received corresponds to the target criterion, via the network interface, a second data file to replace the first data file at the one of the entities, the second data file being based on the profile as changed and the target criterion;
   obtaining, with the batch processor, from a database the profiles from a database the target criteria, wherein data files include the first data file and the second data file and a target criteria includes the target criterion, and wherein the memory device further comprises instructions which, when performed on the batch processor, cause the batch processor to transmit ones of the data files based on relationships between the target criteria and the profiles; and
   transmitting, with the processor, ones of the data files based on:
   the change between the profile and the profiles; and
   the target criteria.

2. The method of claim 1, further comprising selecting, with the processor, the second data file based on the change in the profile and the target criterion.

3. The method of claim 1, wherein transmitting the second data file is upon identifying the change in the profile.

4. The method of claim 1, wherein the first data file and the second data files are electronic cookies.

5. The method of claim 4, wherein the electronic cookies are configured to identify a characteristic of each of the at least some of the entities upon being stored in the at least some of the entities.

6. The method of claim 5, wherein the characteristic is at least one of a user interest, a user demographic characteristic, and a user electronic device usage.

7. A system, comprising:
   a network interface;
   a processor-implemented targeting application programming interface (API) configured to receive a target criterion;
   a batch processor, being a component of an offline system, coupled to the network interface, wherein the targeting API is configured to transmit the target criterion to the batch processor, wherein the batch processor configured, based on receiving the target criterion, to:
   obtain profiles corresponding to entities;
   process the profiles simultaneously to identify at least some of the entities based on a relationship between the profiles and the target criterion; and
   transmit, via the network interface, a first data file to a computing device of the at least some of the entities, wherein the first data file contains information related, at least in part, to the target criterion;
   an electronic storage configured to store the profiles; and a processor, different from the batch processor and being a component of an online system, coupled to the network interface, the processor configured to:
receive, via the network interface, a profile corresponding to one of the entities;
identify a change in the profile as received relative to the profiles stored in the electronic storage by:
obtaining one of the profiles stored in the electronic storage corresponding to the one of the entities;
comparing the one of the profiles with the profile as received to generate a comparison;
obtaining the target criterion from the offline system; and
determining, based on the comparison, that the profile as received corresponds to the target criterion; and
transmit, via the network interface, based on the determination that the profile as received corresponds to the target criterion, a second data file to replace the first data file at the one of the entities, the second data file being based on the profile as changed and the target criterion; and
where the electronic storage further including a database coupled to the batch processor and configured to store the profiles, wherein the batch processor and the processor are configured to obtain the profiles from the database;
wherein the database further comprises data files and target criteria, the data files including the first data file and the second data file, the target criteria including the target criterion;
wherein the batch processor is configured to transmit ones of the data files based on relationships between the target criteria and the profiles; and
wherein the processor is configured to transmit ones of the data files based on:
the change between the profile and the profiles; and
the target criteria.

8. The system as in claim 7, wherein the processor is further configured to select the second data file based on the change in the profile and the target criterion.

9. The system as in claim 7, wherein the processor is configured to transmit the second data file upon identifying the change in the profile.

10. The system as in claim 7, wherein the first data file and the second data files are electronic cookies.

11. The system as in claim 10, wherein the electronic cookies are configured to identify a characteristic of each of the at least some of the entities upon being stored in the at least some of the entities.

12. The system of claim 11, wherein the characteristic is at least one of a user interest, a user demographic characteristic, and a user electronic device usage.

13. The system as in claim 11, further comprising an advertising server configured to transmit an advertisement to ones of the entities based on the entities having stored an electronic cookie that corresponds to a target characteristic of the advertisement.

14. The system as in claim 7, wherein individual ones of the entities are at least one of a user, a web browser, and an electronic device.

15. The system as in claim 14, wherein the target criterion is at least one of a characteristic of a desired recipient of the first or second data file, a characteristic of the first or second data file, and a desired effect of the first or second data file.

16. A memory device, comprising instructions which, when performed on a batch processor, cause the batch processor to perform operations comprising:
obtain profiles corresponding to entities;
obtain a target criterion from processor-implemented targeting application programming interface (API) upon the targeting API receiving the target criterion;
receive, via a network interface, a profile corresponding to one of the entities;
process the profiles simultaneously to identify at least some of the entities based on a relationship between the profiles and the target criterion; and
transmit, via the network interface, a first data file to a computing device of the at least some of the entities, wherein the first data file contains information related, at least in part, to the target criterion; and
wherein the memory device further comprises instructions which, when performed by a processor, cause the processor, to perform operations comprising:
receive, via the network interface, a profile corresponding to one of the entities; identify a change in the profile as received relative to the profiles stored in an electronic storage by:
obtaining one of the profiles stored in the electronic storage corresponding to the one of the entities;
comparing the one of the profiles with the profile as received to generate a comparison;
obtaining the target criterion from the offline system; and
determining, based on the comparison, that the profile as received corresponds to the target criterion; and
transmit, via the network interface, based on the determination that the profile as received corresponds to the target criterion, a second data file to replace the first data file at the one of the entities, the second data file being based on the profile as changed and the target criterion;
wherein the memory device further comprises instructions which cause the batch processor to obtain the profiles from a database the target criteria, wherein data files include the first data file and the second data file and a target criteria includes the target criterion, and wherein the memory device further comprises instructions which, when performed on the batch processor, cause the batch processor to transmit ones of the data files based on relationships between the target criteria and the profiles; and
wherein the memory device further comprises instructions which, when performed on the processor, cause the processor to transmit ones of the data files based on:
the change between the profile and the profiles; and
the target criteria.

17. The memory device as in claim 16, wherein the memory device further comprises instructions which, when performed on the processor, cause the processor to select the second data file based on the change in the profile and the target criterion.

18. The memory device as in claim 16, wherein the memory device further comprises instructions which, when performed on the processor, cause the processor to transmit the second data file upon identifying the change in the profile.

19. The memory device as in claim 16, wherein the first data file and the second data file are electronic cookies.

20. The memory device as in claim 19, wherein the electronic cookies are configured to identify a characteristic of each of the at least some of the entities upon being stored in the at least some of the entities.

21. The memory device of claim 20, wherein the characteristic is at least one of a user interest, a user demographic characteristic, and a user electronic device usage.

22. The memory device as in claim 20, wherein the memory device further comprises instructions which, when performed on the processor, cause the processor to transmit an advertisement to ones of the entities based on the entities having stored an electronic cookie that corresponds to a target characteristic of the advertisement.

23. The memory device as in claim 16, wherein individual ones of the entities are at least one of a user, a web browser, and an electronic device.

24. The memory device as in claim 23, wherein the target criterion is at least one of a characteristic of a desired recipient of the first or second data file, a characteristic of the first or second data file, and a desired effect of the first or second data file.

* * * * *

UNITED STATES PATENT AND TRADEMARK OFFICE
CERTIFICATE OF CORRECTION

PATENT NO. : 9,965,566 B2
APPLICATION NO. : 13/665742
DATED : May 8, 2018
INVENTOR(S) : Huang et al.

Page 1 of 1

It is certified that error appears in the above-identified patent and that said Letters Patent is hereby corrected as shown below:

In the Claims

In Column 14, Line 21, in Claim 16, after "entities;", insert --¶--

Signed and Sealed this
Fourth Day of June, 2019

Andrei Iancu
*Director of the United States Patent and Trademark Office*